US007862062B2

(12) United States Patent
Armand et al.

(10) Patent No.: US 7,862,062 B2
(45) Date of Patent: Jan. 4, 2011

(54) NON-MOTORIZED VEHICLE (75) Inventors: Anthony Armand, Huntington Beach, CA (US); Ken Edlauer, Newbury Park, CA (US); Jack B. Lovley, II, Lake Forest, CA (US)

(73) Assignee: Bravo Sports, Santa Fe Springs, CA (US)

( * ) Notice: Subject to any disclaimer, the term of this patent is extended or adjusted under 35 U.S.C. 154(b) by 91 days.

(21) Appl. No.: 12/367,926

(22) Filed: Feb. 9, 2009

(65) Prior Publication Data
US 2009/0200768 A1    Aug. 13, 2009

Related U.S. Application Data
(60) Provisional application No. 61/027,302, filed on Feb. 8, 2008.

(51) Int. Cl.
*B62M 1/04* (2006.01)
(52) U.S. Cl. .................................... 280/221; 280/251
(58) Field of Classification Search ............. 280/221, 280/220, 251, 253, 258
See application file for complete search history.

(56) References Cited

U.S. PATENT DOCUMENTS

| 1,237,969 | A | 8/1917 | Stocks |
| 2,544,996 | A | 3/1951 | Kander |
| 3,180,656 | A | 4/1965 | Gruenstein |
| 3,992,029 | A | 11/1976 | Washizawa et al. |
| 4,124,222 | A | 11/1978 | Moe et al. |
| 4,186,934 | A * | 2/1980 | Collings ............... 280/221 |
| 4,761,014 | A | 8/1988 | Huang |
| 5,163,696 | A | 11/1992 | Pesco, Sr. |
| 5,192,089 | A | 3/1993 | Taylor |
| 6,419,251 | B1 | 7/2002 | Chueh |
| 6,688,624 | B2 | 2/2004 | Christensen et al. |
| 6,769,706 | B2 | 8/2004 | Chow |
| 6,796,570 | B1 | 9/2004 | Chang |
| 6,857,648 | B2 | 2/2005 | Mehmet |
| 7,044,488 | B1 | 5/2006 | Hamend |
| 7,377,532 | B2 * | 5/2008 | Bauce ............... 280/221 |
| 2002/0163159 | A1 | 11/2002 | Christensen et al. |
| 2003/0098566 | A1 | 5/2003 | Christensen et al. |
| 2004/0036249 | A1 | 2/2004 | McGuire et al. |
| 2005/0194759 | A1 | 9/2005 | Chen |
| 2006/0038373 | A1 | 2/2006 | von Detten |
| 2010/0001487 | A1 * | 1/2010 | Pang ............... 280/221 |

OTHER PUBLICATIONS

Honda Kick and Go Scooter, 2 photos (date unknown).

* cited by examiner

*Primary Examiner*—Anne Marie M Boehler
(74) *Attorney, Agent, or Firm*—Holland & Hart LLP (57) ABSTRACT

A non-motorized foot board scooter including a frame, a front wheel and a rear wheel, a steering assembly, and a drive train. The drive train includes a kick arm that rotates the rear wheel when the kick arm is pushed backwards by the rider. The kick arm is centered with the rear wheel and a kick guard is located between the rear wheel and the kick arm. A first sprocket is mounted to the arm. The rear wheel has an associated second sprocket that is connected to the rear wheel via a clutch. A chain is mounted to the frame and extends around the first and second sprockets. The chain is routed such that as the arm is rotated the chain is drawn across the second sprocket thereby rotating the drive wheel.

14 Claims, 10 Drawing Sheets

NON-MOTORIZED VEHICLE

This application claims the benefit of U.S. Provisional Application No. 61/027,302, filed Feb. 8, 2008. This application is related to U.S. Design Patent Application No. 29/299,331, filed Dec. 21, 2007.

FIELD OF THE INVENTION

The invention described herein relates generally to non-motorized vehicles. More specifically, the invention described herein relates to non-motorized foot board scooters having a kick arm for rider-generated propulsion of the scooter.

BACKGROUND

Non-motorized foot board scooters are known in the art. These scooters generally include a front wheel aligned with a back wheel, with each of the wheels being attached to a frame. The frame generally comprises a flat surface located between the two wheels for the rider to stand on and a steering column rising vertically from the front end of the flat surface. The steering column is attached at one end to the front wheel for front wheel steering of the scooter and terminates at the other end in handle bars for the rider to use to steer the scooter. Forward movement of these non-motorized foot board scooters is normally achieved by the rider taking one foot off the flat surface and pushing against the ground with the foot removed from the flat surface to begin forward movement of the scooter.

In some non-motorized foot board scooters known in the art, an improved means for propelling the scooter forward is included. For example, as shown in U.S. Pat. No. 6,857,648, depression of a pedal located on the foot board of the scooter causes gears and chains located under the foot board to turn. The chains are connected to the back wheel of the scooter, and therefore movement of the chains cause the back wheel to turn and propel the scooter forward. However, the size and placement of the pedal in the '648 patent limit the downward force the rider can apply and also the speed at which the pedal can be depressed. These limitations limit the ability of the rider to generate speed.

Accordingly, there exists a need for an improved non-motorized foot board scooter having a human-generated propulsion mechanism for propelling the scooter forward.

SUMMARY

Described herein are various embodiments of a non-motorized foot board scooter that overcome many of the disadvantages and shortcomings of conventional non-motorized foot board scooters.

Generally, the non-motorized foot board scooter comprises a frame, a steering column, a foot board, a drive train housing, a drive train, a front wheel and a rear wheel. The drive train includes a kick arm that rotates the rear wheel when the kick arm is pushed backwards by the rider. The kick arm is centered with the rear wheel and is curved in a manner that mimics the curvature of the rear wheel. The drive train housing includes a kick guard located over a portion of the rear wheel. Braking of the scooter is achieved via a band brake or friction brake located on the rear wheel.

The frame may be an elongate frame having a length and a width. The kick guard may be located between the kick arm and the rear wheel. A steering assembly may be pivotably disposed on the frame, which could include a front wheel and handlebars.

The drive train may including an arm rotatably disposed on the frame and extending upwardly from the center of the width of the frame. A first sprocket is mounted to the arm and may be offset to the side of the arm or from the center of the frame. The rear wheel or drive wheel has an associated second sprocket that may be connected to the rear wheel via a clutch or free-wheel. The clutch may be a one way bearing such as a one way needle bearing.

A chain including a first end portion is mounted to the frame at a first location and extends around the first and second sprockets. The chain includes a second end portion mounted to the frame at a second location. The chain is routed such that as the arm is rotated the chain is drawn across the second sprocket thereby rotating the drive wheel. The chain may also extend around a pulley wherein the pulley is resiliently biased against the chain, such as by a spring.

In one embodiment the first sprocket includes a plurality of teeth disposed about a first axis and is rotatably mounted to the arm about a second axis that is offset from the first axis. Furthermore, each of the plurality of teeth may be disposed equidistant from the first axis. Also, the second end portion of the chain may be secured to a movable mount, whereby movement of the movable mount causes the first sprocket to rotate independently of the arm. The vehicle may also include a hand lever mounted on the handlebars and a cable connected between the hand lever and the movable mount. Movement of the hand lever causes the movable mount to change positions thereby rotating the first sprocket independently of the arm.

The foregoing and other features, utilities, and advantages of the foot-board scooter will be apparent from the following more particular description of the embodiments as illustrated in the accompanying drawings.

BRIEF DESCRIPTION OF THE DRAWINGS

The accompanying drawings, which are incorporated in and constitute a part of this specification, illustrate multiple embodiments of a foot-board scooter and together with the description, serve to explain the principles thereof. Like items in the drawings are generally referred to using the same numerical reference.

DETAILED DESCRIPTION

Figure 1:
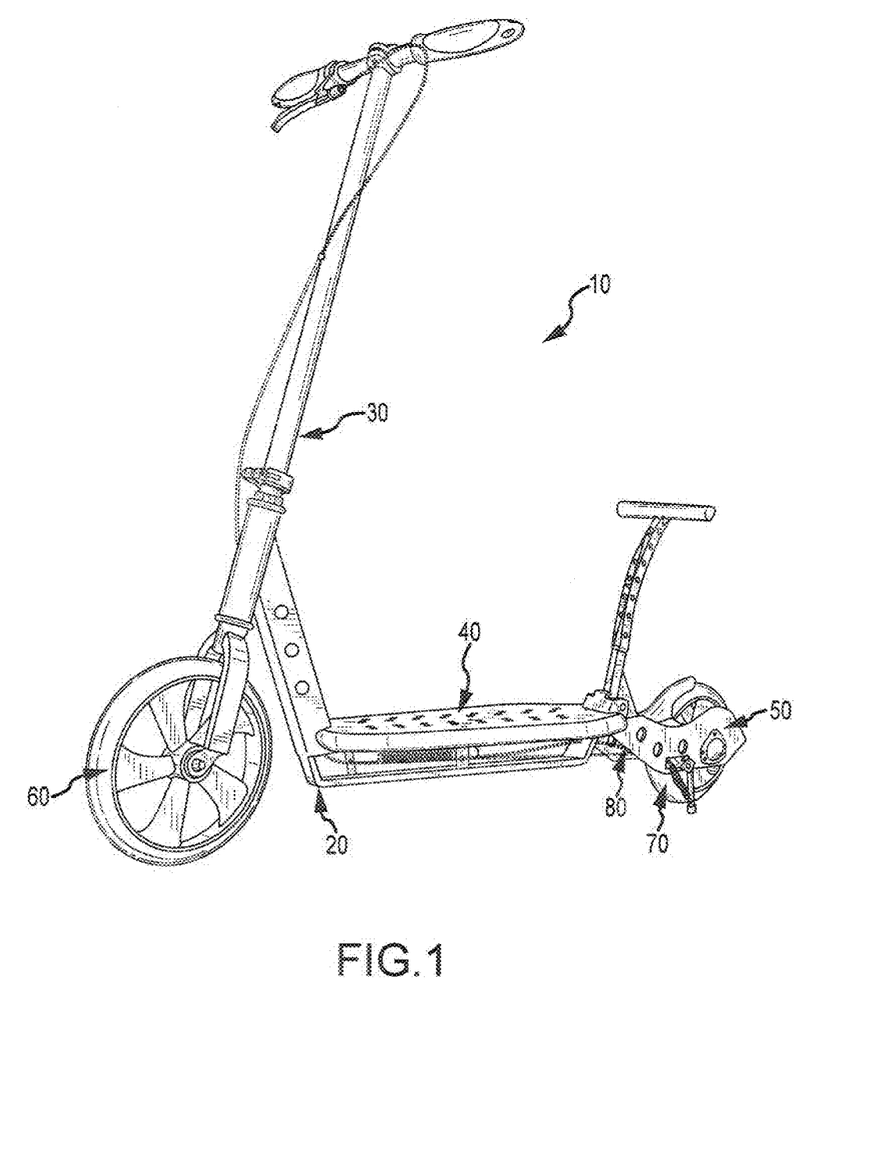
FIG. 1 is a perspective view of a scooter according to a first exemplary embodiment.

In one embodiment of the present invention, a non-motorized foot board scooter having a mechanism for providing rider-generated propulsion of the scooter is disclosed. As shown in FIG. 1, the scooter 10 generally comprises a frame 20, a steering column 30, a foot board 40, a drive train housing 50, a front wheel 60, a rear wheel 70 and a drive train 80.

Figure 2:
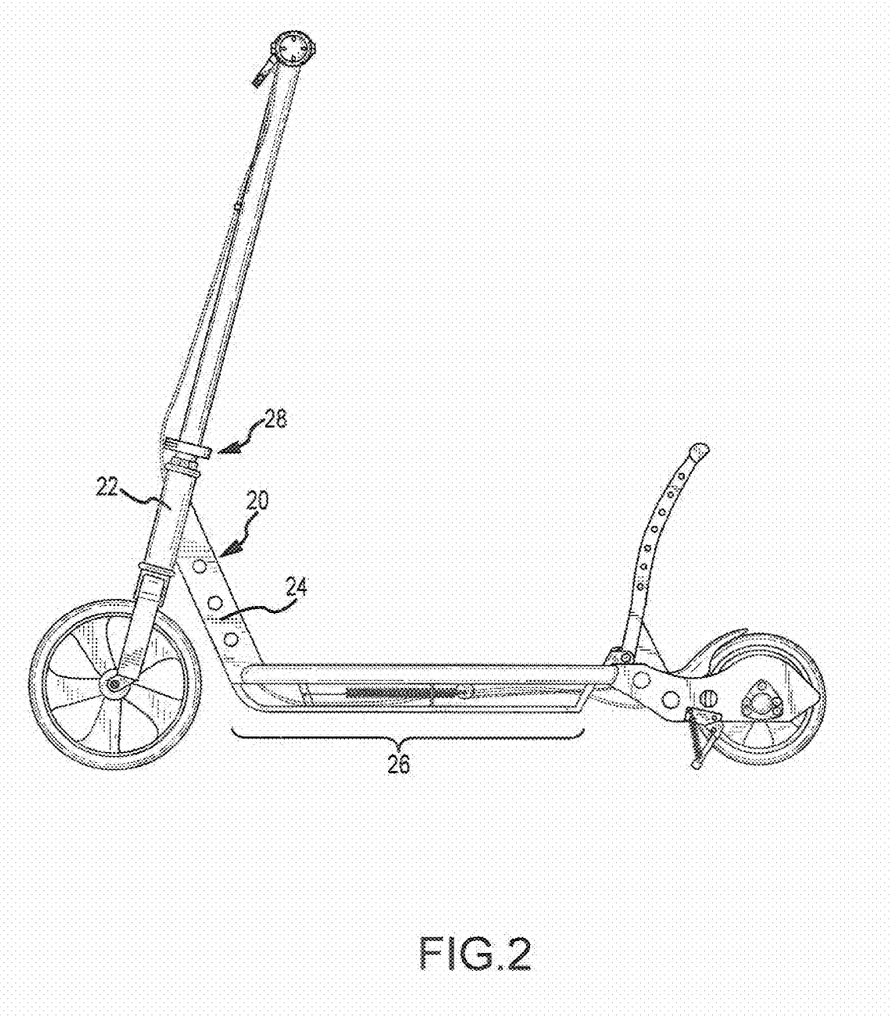
FIG. 2 is a left side elevation view thereof.

As shown in FIG. 2, the frame 20 generally comprises a steering column receiving portion 22, a bridge portion 24 and a foot board supporting potion 26.

The steering wheel column receiving portion 22 generally comprises a hollow cylinder through which the steering column 30 passes. The steering wheel column receiving portion 22 has an inner diameter approximately equal to the outer diameter of the steering column 30. The steering wheel column receiving portion 22 may also have a clamp 28 at the top end. When the clamp 28 is closed, the steering wheel column 30 is fixed in place and cannot slide up or down in the hollow cylinder. When the clamp 28 is open, the steering wheel column 30 may move up and down in the hollow cylinder. In this manner, the steering wheel column may be folded down to make the scooter 10 more compact.

The bridge portion 24 of the frame 20 connects the steering wheel column receiving portion 22 to the foot board supporting portion 26 of the frame 20. The bridge portion 24 may have a variety of shapes. In FIG. 2, the shape of the bridge portion 24 is predominantly rectangular and straight. However, the bridge portion 24 may also be curved or have any other suitable shape. Bridge portion 24 may be pivotably connected to either steering column 30 or foot board supporting portion 26 to collapsing the frame for storage or the like.

The foot board supporting portion 26 provides a platform on which the foot board 40 may be placed. As shown in FIG. 2, the foot board supporting portion 26 also may be used as a housing for a portion of the drive shaft 80 and the brake line or cable 39 extending between the hand brake on the handle bar and the rear wheel 70. As with the bridge portion 24, the foot board may have any suitable shape. Preferably and as shown in FIG. 2, the foot board supporting portion 26 is aligned parallel to the ground so as to maintain a clearance between the scooter 10 and the ground.

The material of the frame 20, including the steering column receiving portion 22, the bridge portion 24 and the foot board support portion 26 may be any suitable material, such as metal or a durable plastic.

Figure 3:
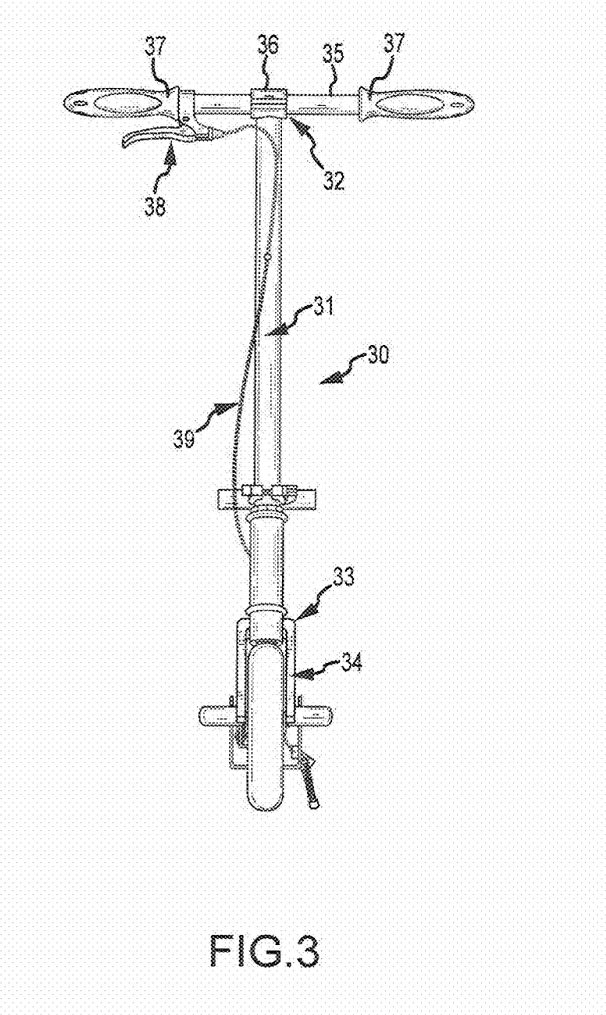
FIG. 3 is a front side elevation view thereof.

As shown in FIG. 3, the steering column 30 generally comprises a cylindrical body 31 having a top end 32 and a bottom end 33, a fork 34 coupled to the bottom end 33 for receiving the front wheel 60 and a handle bar 35 located at the top end 32.

As noted earlier, the cylindrical body 31 has an outer diameter approximately equal to the inner diameter of the steering wheel column receiving portion 22.

A fork 34 is located at the bottom end 33 of the cylindrical body 31. The space between the two prongs of the fork 34 is slightly larger than the width of the front wheel 60 so that the front wheel 60 does not rub against the fork 34 when in motion. Similarly, the length of the inside surface of the two prongs of the fork 34 is slightly larger than the radius of the front wheel 60 so the front wheel 60 may rotate freely. The terminal ends of the prongs of the fork 34 include a means for coupling to the front wheel 60 in manner that allows the front wheel 60 to rotate. For example, a rod or axle may extend between the terminal ends of the prongs of the fork 34 and pass through a center hole in the front wheel 60.

Handle bar 35 is located at the top end 32 of the cylindrical body 31. As shown in FIG. 3, the handle bar 35 may be coupled to the cylindrical body via a clamp 36. Any other suitable means of coupling the handle bar 35 to the cylindrical body 31 also may be employed. As shown in FIG. 3, the handle bar 31 is oriented perpendicularly to the cylindrical body 31. In FIG. 3, the handle bar 31 is straight, although in other aspects of the embodiment, the handle bar 31 may have curves or bends. Handle bar grips 37, made from any suitable material and having any suitable shape, may be placed at both ends of the handle bar 35. Additionally, a hand brake 38 may be placed on the handle bar 35. While only one hand brake 38 is illustrated in FIG. 3, a second hand brake may also be located on the handle bar 35. The hand brake 38 is connected to the braking mechanism, discussed in greater detail below, via the brake cable 39. The brake cable 39 may be coupled to the cylindrical body 31 at various points to keep the brake cable 39 from getting tangled, and as mentioned previously, the brake cable 39 may run through the foot board support portion 26 on its way to the brake mechanism on the rear wheel 70.

The material of the steering column 30, including the cylindrical body 31, the fork 34 and handle bar 35, may be any suitable material, including metal or durable plastic.

Figure 4:
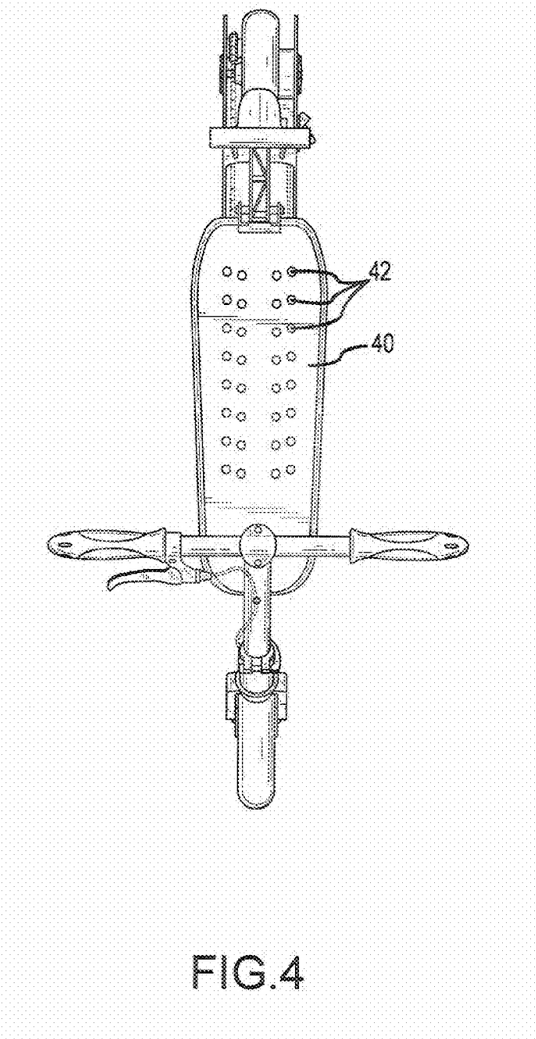
FIG. 4 is a top plan view thereof.

As shown in FIG. 4, the foot board 40 generally comprises an elongated flat surface on which the rider may stand. While FIG. 4 illustrates a foot board having a generally rectangular shape with rounded corners, any suitable shape for the foot board may be used. The width of the foot board 40 is preferably such that both feet of a rider may fit on the foot board 40 whether the rider's feet are aligned in parallel with the foot board 40 or perpendicularly to the foot board 40. The surface of the foot board 40 may have treads, a rough surface or any other means for preventing slipping on the foot board. Additionally, holes 42 may be formed in the foot board 40 to prevent water from collecting on the foot board 40. The material of the foot board 40 may be any suitable material, such as metal or durable plastic.

Figure 5:
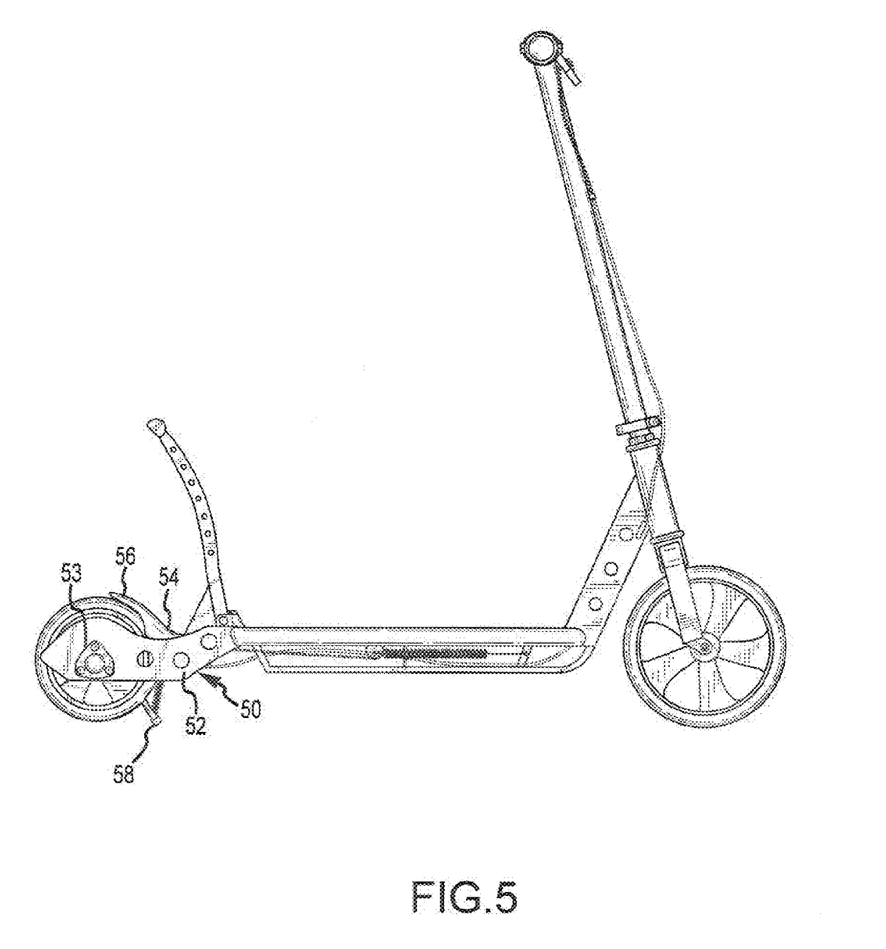
FIG. 5 is a right side elevation view thereof.

As shown in FIG. 5, a drive train housing 50 is located at the rear end of the scooter 10. The drive train housing 50 extends away from the foot board 40 and is generally oriented parallel to the ground. The drive train housing 50 is coupled to the foot board 40 using any suitable means, such as by welding.

Drive train housing 50 generally comprises a right side plate 52, a left side plate (not shown) and a top plate 54. The right side plate 52 and left side plate are aligned parallel to each other and perpendicular to the foot board 40. A space is maintained between the right side plate 52 and left side plate such that the drive train 80 and rear wheel 70 will fit between and be protected by the two plates. As shown in FIG. 5, the height of the right side plate 52 increases as the right side plate extends away from the foot board 40 in order to cover and protect the sides of the rear wheel 70. Right side plate 52 and left side plate also include a rear wheel securing portion 53. The rear wheel securing portion 53 generally comprises a rod or axle extending between the right side plate 52 and left side plate and which passes through the rear wheel 70 centered between the right side plate 52 and left side plate. The axle also may pass through and hold in position the brake and portions of the drive train discussed in greater detail below. As shown in FIG. 5, the rear wheel securing portion 53 is secured to the right side plate 52 and left side plate via a series of bolts that pass through a face plate to which the rod is coupled and the right side plate 52 or left side plate.

The left side plate not shown in FIG. 5 is a mirror image of right side plate 52 and is therefore essentially as described above. As shown in FIG. 5, left side plate does differ from right side plate 52 in that a kick stand 58 is coupled to left side plate. The kick stand 58 may be any kick stand known in the art, and as shown in FIG. 5, the kick stand 58 may include a spring for retracting the kick stand 58 when not in use. While the kick stand 58 is shown on the left side plate in FIG. 5, the kick stand 58 could also be located on the right side plate 52 or in any other suitable location along the scooter 10.

The right side plate 52 and left side plate are coupled together at a portion of their top edges by the top plate 54. The top plate 54 is generally aligned perpendicularly to the right side plate 52 and left side plate and in parallel to the foot board 40. A gap exists between the rear end of the foot board 40 and the front end of the top plate 54 such that the top plate 54 does not directly contact the foot board 40. That is to say, the foot board 40 is coupled to the drive train housing 50 only at the right side plate 52 and left side plate. The gap between the foot board 40 and the top plate 54 serves as the area through which a kick arm of the drive train, as described in greater detail below, may pass. Additionally, the top plate 54 does not extend back the entire length of the right side plate 52 and left side plate. In this manner, a rear wheel 70 may be centered between the right side plate 52 and left side plate at the rear portion of the drive train housing 50 and extend above the right side plate 52 and left side plate.

The top plate 54 includes a kick guard 56 extending away from the rear portion of the top plate 54 and inclining upwardly in a curved fashion that follows the shape of the rear wheel 70. The kick guard 56 only extends from the center of the rear of the top plate 54 and therefore does not have a width equal to the gap between the right side plate 52 and left side plate. Rather, the width of the kick guard 56 is approximately equal to the width of the rear wheel 70. The length of the kick guard 56 is from the rear portion of the top plate 54 to its termination point at approximately the apex of the curve, i.e., before the curve begins to take a downward turn. The center portion of the top plate 54 from which the kick guard 56 extends is aligned with the centered position of the rear wheel 70 in the drive train housing 50. As mentioned above, the curvature of the kick guard 56 generally mimics the radius of curvature of the rear wheel 70. The kick guard 56 is positioned such that the curved kick guard 56 sits slightly above the rear wheel 70 without contacting the rear wheel 70. Given the above description of the shape and positioning of the kick guard 56, it is apparent that the kick guard 56 protects the rear wheel 70 from being contacted by the rider or the kick arm, and thereby increases the safety of the scooter. The top plate 54 and kick guard 56 also may be shaped differently than as described above to accomplish the same objective.

The material of the drive train housing, including the left side plate, right side plate, top plate and kick guard, may be any suitable material, such as metal or durable plastic.

Figure 6:
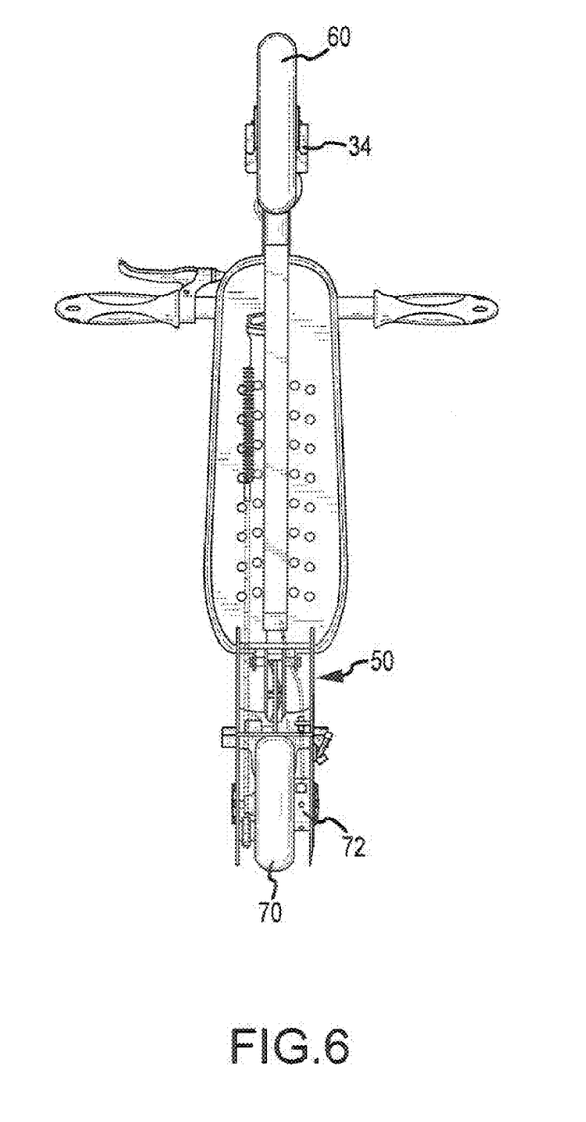
FIG. 6 is a bottom plan view thereof.

As mentioned above, the scooter includes a front wheel 60 and a rear wheel 70. As shown in FIG. 6, the front wheel 60 is positioned between the fork 34 and the rear wheel 70 is positioned between the left side plate and right side plate 52 of the drive train housing 50. Both the front wheel 60 and the rear wheel 70 are mounted to the scooter in a manner that allows for free forward rotation of the wheels.

As shown in FIG. 6, front wheel 60 is larger in diameter than rear wheel 70, while both wheels have the same width. However, the front wheel 60 may have a diameter smaller than or equal to the diameter of the rear wheel 70. The front wheel 60 may also have a larger or smaller width than the rear wheel 70. The material of either the front wheel 60 or rear wheel 70 is not limited. Any suitable material may be used, such as rubber or plastic.

Figure 7:
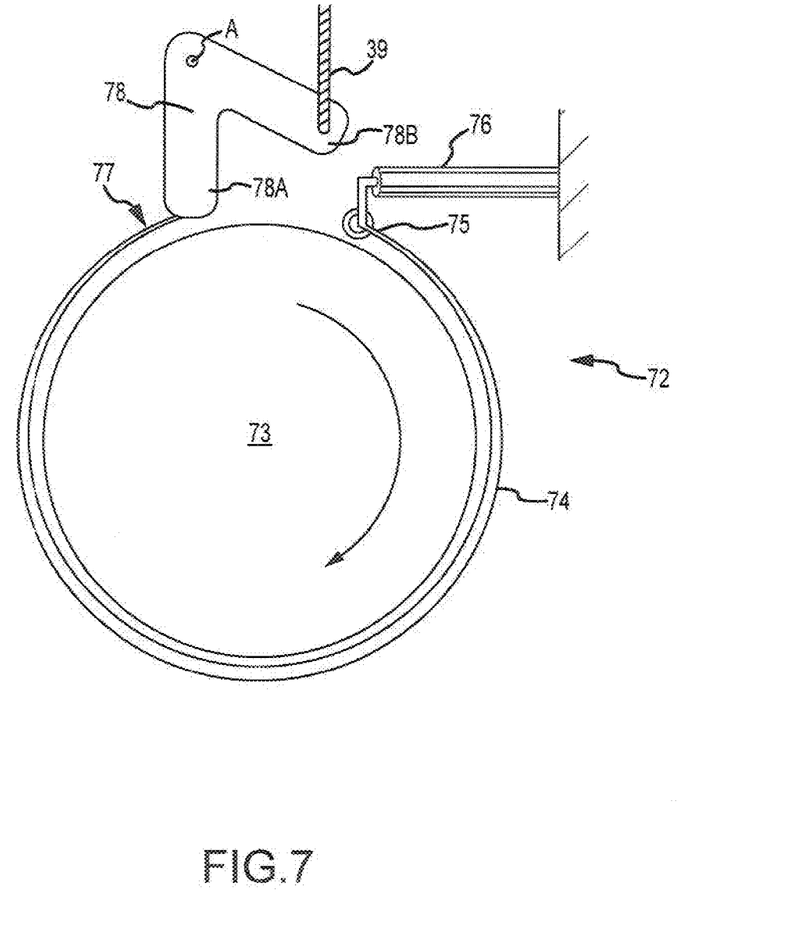
FIG. 7 is a cross-sectional view of the band brake system employed on the scooter shown in FIGS. 1-6.

The rear wheel 70 may include a brake 72. In the presently described invention, the brake is a band brake. A band brake as used in the present invention as illustrated in FIG. 7. A central portion or drum 73 of the rear wheel 70 extends out from the rear wheel perpendicularly to provide an area around which the band 74 may wrap. A first end 75 of the band 74 is secured to an anchor 76 that does not move. The second end 77 of the band 74 is secured to one arm 78A of a pivoting member 78 that pivots about point A. A second arm 78B of the pivoting member 78 is secured to the brake cable 39 described above in relation to the steering column 30 shown in FIG. 3. In a non-braking position, the band 74 is slack around the central portion 73 as shown in FIG. 7. When the rider grips the hand brake 38 illustrated in FIG. 3, the brake cable 39 is pulled taught, causing the pivoting portion 78 to pivot about point A due to the attachment of brake cable 39 to second arm 78B. This in turn causes the first arm 78A to move and pull band 74 taught against the central portion 73. Any rotation of the drum 73 (i.e., rotation of the rear wheel 70) is slowed or stopped due to the friction between the band 74 and the drum 73. Band 74 and drum 73 therefore each preferably have high friction surfaces so that the rotating drum 73 does not slip against the band 74 when the band is pulled taught around the central portion 73.

As shown in, for example, FIG. 4, the scooter 10 includes a brake 72 only on the rear wheel 70. However, as discussed above, the scooter 10 may have a second hand brake lever on the handle bar 35. The second hand brake lever may, for example, be connected to a band brake or other style of brake, such as a caliper, or disc brake located in relation to front wheel 60 of the scooter 10.

Figure 8:
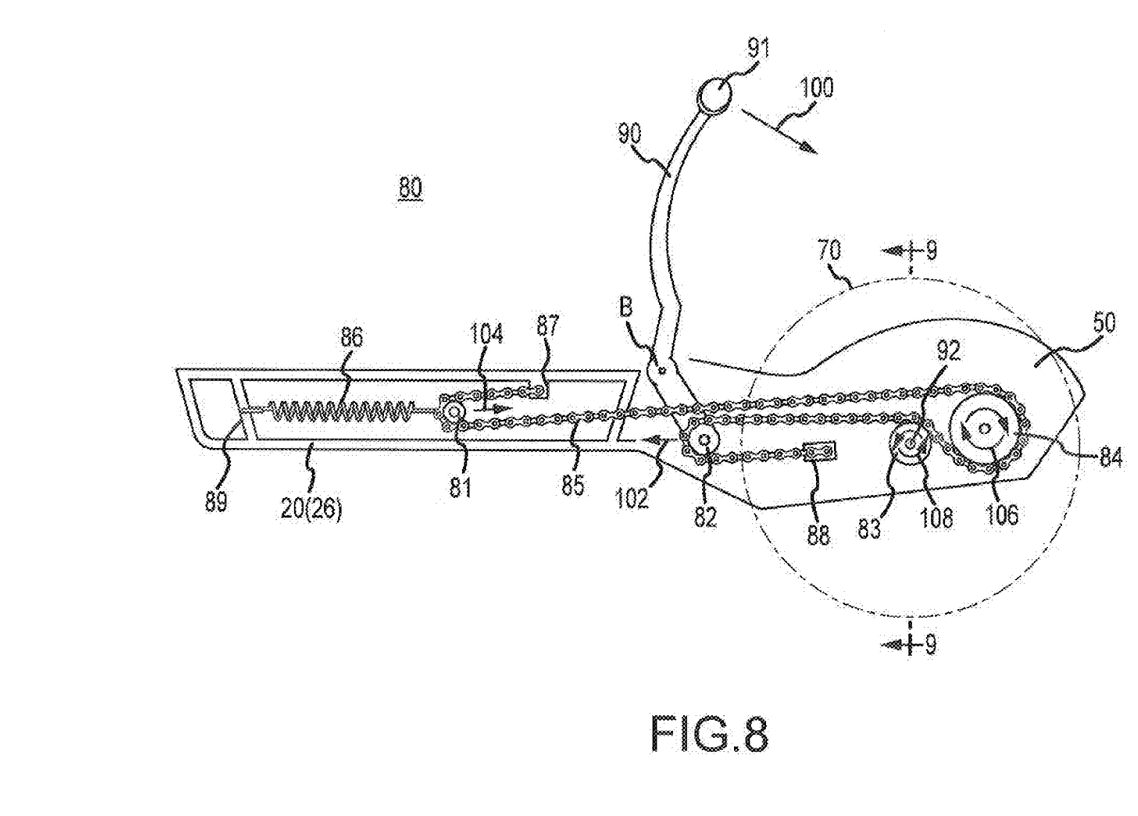
FIG. 8 is a partial simplified cross-sectional view illustrating the drive train system as shown in FIGS. 1-7.

The drive train 80 is the mechanism for allowing the rider of the scooter 10 to propel the scooter forward without having to take one foot off the foot board and push against the ground. The drive train 80 is illustrated in FIG. 8. The drive train generally includes first pulley 81, first sprocket 82, second sprocket 83, second pulley 84, chain 85, spring 86, first chain anchor point 87, second chain anchor point 88, spring anchor point 89, and kick arm 90.

In operation, the drive train works by pushing back on kick arm 90 causing first sprocket 82 to move forward thus pulling chain 85 across second sprocket 83. Movement of chain 85 across second sprocket 83 causes it to rotate. Second sprocket 83 is coupled to axle 92 which is in turn attached to rear wheel 70. Accordingly, pushing back on kick arm 90 causes rear wheel 70 to rotate and propel the scooter forward.

Kick arm 90 of drive train 80 is a relatively thin bar that extends vertically from its connection point with the drive train 80 to a position above the foot board. As noted previously, a gap between the rear end of the foot board 40 and the top plate 54 of the drive train housing 50 is provided for the kick arm to extend up and out of the drive train housing 50. Advantageously, kick arm 90 protrudes from the drive train housing 50 in the center of the width of the scooter.

A foot bar 91 is located at the top end of the kick arm 90. The foot bar 91 is aligned perpendicularly to the kick arm 90. The foot bar 91 connects with the kick arm 90 in the middle of the foot bar 91 such that the foot bar 91 extends equally to the left and right of the kick arm 90. Accordingly, given the placement of the kick arm 90 in the center of the width of the scooter and the foot bar 91 which extends to both the left and right of the kick arm 90, a rider of the scooter may easily push down on the kick arm 90 via the foot bar 91 with either their left or right foot. Furthermore, because kick arm 90 is located along the center line of the scooter, the force applied to the kick arm is directed along the center of the scooter, thereby reducing the amount of torque generated between the handle bars and kick arm.

FIG. 8 also illustrates that the kick arm 90 has a curvature rather than being a perfectly straight bar. As with the kick guard 56, the curvature of the kick arm 90 has a curve that resembles the curve of the rear wheel 70. By providing the kick arm 90 with a curvature that resembles the curvature of the rear wheel 70 and kick guard 56, the rider will be able to push the kick arm 90 down further than would be possible if the kick arm were straight and is thereby able to generate more forward propulsion of the scooter via the drive train. If the kick arm were straight, the lower portion of the kick arm would come into contact with the kick guard 56 earlier than if the kick guard has a curvature. The curvature of the kick arm 90 means that the lower portion of the kick arm 90 will curve around the kick guard 56 and allow for further backward movement of the kick arm 90.

The kick arm 90 pivots about pivot point B shown in FIG. 8. Pivot point B may be, for example, a rod extending between the left side wall and right side wall 52 of the drive train housing 50 or a rod that extends between a small housing included at the rear portion of the foot board 40, wherein the rod also passes through a hole in the kick arm 90. When the kick arm is pushed backward as shown by arrow 100, the first sprocket 82 coupled to the bottom end of the kick arm 90 moves in the direction indicated by arrow 102. The first sprocket 82 is coupled to the bottom end of the kick arm 90 in a manner which allows the first sprocket 82 to freely rotate. Therefore, as the first sprocket 82 is moved in the direction of arrow 102, the first sprocket 82 rotates, grips the chain 85 and passes the chain 85 around the first sprocket 82.

Chain 85 is anchored at one end at first chain anchor point 87 and at a second end at second chain anchor point 88. First chain anchor point 87 and second chain anchor point 88 may be, for example, tabs that extend from the foot board supporting portion 26 and the left side wall or right side wall 52 of the drive train housing 50 and the chain 85 may be coupled to the anchor portions by any suitable means. Because the chain 85 is anchored at first chain anchor point 87 and second chain anchor point 88, movement of the first sprocket 82 as discussed above must be accompanied by movement of another component of the drive train to allow for movement of the chain 85. Accordingly, first pulley 81 is attached to spring 86. The spring 86 and first pulley 81 may be coupled by, for example, a hook extending from the end of the spring and hooking through a hole in the middle of the first pulley 81. Similarly, the spring 86 may be anchored to a portion of the frame 20 via a hook extending from the opposite end of the spring and hooking through a hole in a portion of the frame 20.

When the kick arm 90 is pushed back, causing the first sprocket 82 to move in the direction of arrow 102, spring 86 extends to allow first pulley 81 to move in the direction indicated by arrow 104. The chain 85 rotates around the first pulley 81 and thereby provides slack for the first sprocket 82 to take up when moving the chain 85 around the first sprocket 82. In this manner, the chain 85 anchored at both ends is capable of moving and causing second sprocket 83 and second pulley 84, which are stationary, to rotate.

As noted above, movement of first pulley 81 and first sprocket 82 and the corresponding movement of chain 85 causes rotation of the second sprocket 83 and the second pulley 84. Unlike first pulley 81 and first sprocket 82, second pulley 84 only rotates about a stationary axis. Thus, when the chain 85 moves past second sprocket 83 and second pulley 84 due to movement of first pulley 81 and first sprocket 82, second pulley 84 rotate about its axis.

The axis about which second pulley 84 rotates may be a rod coupled to an inside side wall of the drive train housing 50. The rod for the second pulley 84 is stationary; therefore the second pulley 84 rotates about the rod without the rod rotating. The direction of rotation of second pulley 84 is indicated by arrow 106.

When the kick arm 90 is fully pushed back, the first sprocket 82 is pushed in the direction of arrow 102 to its fullest extent and first pulley 81 is pulled against spring 86 in the direction of arrow 104 to its fullest extent. Spring 86 is fully extended when the kick arm 90 is fully pushed back. Accordingly, when pressure is no longer applied on the kick arm in its fully pushed back position, the spring 86 under tension recoils to pull the first pulley 81 back to its resting position, which in turn causes first sprocket 82 to return to its resting position and kick arm 90 to return to its resting position. In this manner, kick arm 90 remains in the resting position whenever force is not applied thereto and kick arm 90 always returns to its resting position when force previously applied to the kick arm 90 is removed. Restoring the drive train 80 to the resting position causes all components of the drive train 80 to rotate in the opposite direction of the direction the components rotated when force is applied to the kick arm 90.

However, when force is no longer applied to the kick arm 90 and the drive train 80 operates in reverse to return to resting position, the rear wheel 70 will not rotate in reverse because of the free-wheel interface between sprocket 83 and axle 92. In this case, the free-wheel or clutch arrangement comprises a one-way needle bearing 93 (see FIG. 9). Bearing 93 is disposed between sprocket 83 and axle 92. As sprocket 83 rotates forward (in the direction of arrow 108) one-way needle bearing 93 engages axle 92 thus rotating the axle and driving the scooter forward. However, when sprocket 83 begins to rotate in reverse as the drive train 80 reverts back to its resting position, one-way needle bearing 93 disengages from axle 92 thus allowing the wheel to freely rotate independent of the rotation of sprocket 83.

Figure 9:
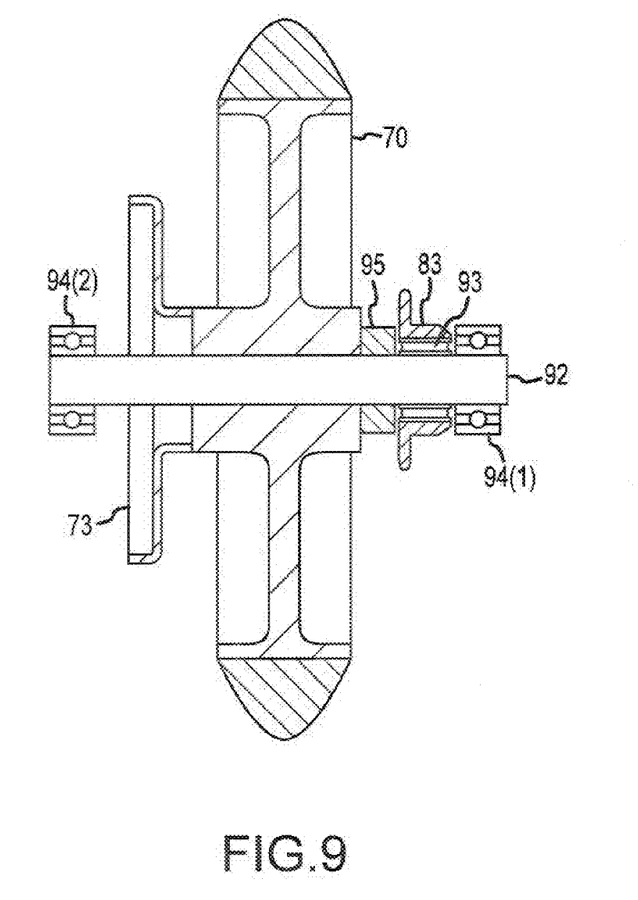
FIG. 9 is a simplified cross-sectional view of the rear wheel taken about line 9-9 as shown in FIG. 8.

FIG. 9 is a cross-section of rear wheel 70 with the brake band and housing as well as the drive train housing not shown for clarity. It can be appreciated that wheel 70 is affixed to axle 92. Axle 92 in turn rotates in bearings 94(1) and 94(2), which are mounted to housing 50. Brake drum 73 is also affixed to wheel 70. Thus, it can be appreciated that wheel 70, axle 92 and brake hub 73 all rotate together in bearings 94(1) and 94(2). Bearings 94 can be any suitable bearing such as a ball bearing or roller bearing. Also, shown in FIG. 9 is sprocket 83 mated with one-way bearing 93. In this case, one way bearing 93 is a needle bearing. It should be understood that other one way bearings may be utilized as well as pawl and ratchet arrangements commonly used on bicycles. A spacer 95 may be disposed between sprocket 83 and the hub portion of wheel 70 to control the location of sprocket 83 relative to the rest of the drive train components.

Figure 10:
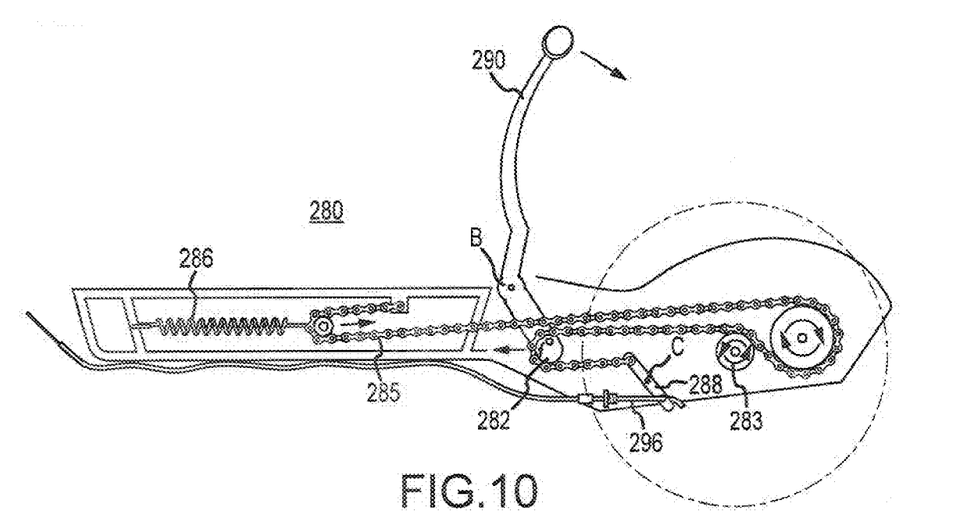
FIG. 10 is a simplified cross-sectional view of a drive train system employed in a second exemplary embodiment of a scooter.
Figure 11A:
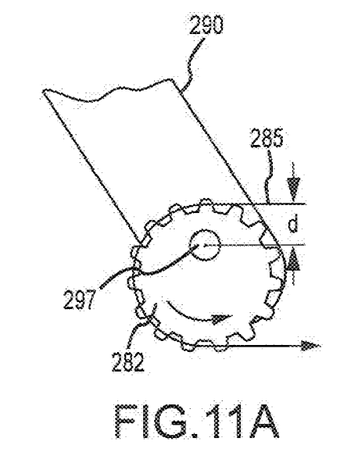
FIG. 11A is an enlarged partial view illustrating the cam sprocket shown in FIG. 10.
Figure 11B:
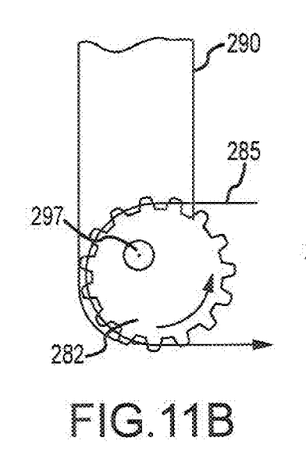
FIG. 11B is an enlarged partial view similar to FIG. 11A with the cam sprocket rotated.
Figure 11C:
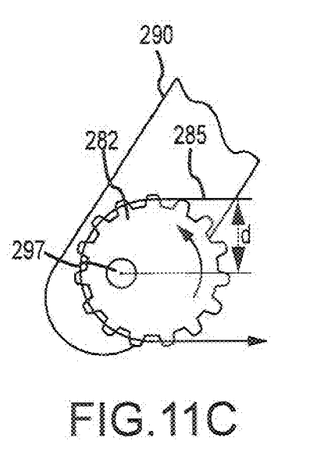
FIG. 11C is an enlarged partial view similar to FIGS. 11A and 11B with the cam sprocket rotated still further.

A second exemplary embodiment of a scooter drive train 280 is illustrated in FIG. 10. Drive train 280 is similar to that described above with respect to the first exemplary embodiment. In this embodiment, however, the first sprocket is replaced with a cam sprocket 282 that is pivotally mounted about pivot pin 297 offset from its center. With further reference to FIGS. 11A-11C, it can be appreciated that as kick arm 290 is pushed back about pivot B, cam sprocket 282 rotates in a counter-clockwise direction. As cam sprocket 282 rotates the effective diameter of the sprocket changes in relation to chain 285 (shown schematically for clarity). Thus, cam sprocket 282 provides a cam effect. The cam effect may be varied by rotating the starting position of the cam sprocket 282. For instance, in FIG. 11A, the sprocket is positioned to provide the least resistance to rotation. At this point the distance "d" between pivot 297 and the tangent point of chain 285 is at its minimum. On the other hand, as shown in FIG. 11C, distance "d" is approaching its maximum. When "d" is at its maximum, resistance to rotation is greatest. It should be appreciated that as the resistance to rotation varies, the rate at which chain 285 is pulled across sprocket 283 varies accordingly.

As shown in FIG. 10, the position of the second anchor point of chain 285 may be varied with anchor lever 288, which rotates about an anchor pivot C. As anchor cable 296 is pulled cam sprocket 282 rotates counter-clockwise, thereby changing the starting position of cam sprocket 282 without moving kick arm 290. Cable 296 may be pulled using a hand lever arrangement similar to that described above with respect to the brake mechanism. In use, a rider could start with anchor lever 288 in a starting position as shown in FIG. 10, wherein cam sprocket 282 is in a minimum resistance position, such as shown in FIG. 11A. This allows the rider to propel the scooter from a stop or up a hill with less initial effort. As the rider propels the scooter, cable 296 may be pulled thereby rotating the cam sprocket's starting position toward the maximum resistance position thus providing more propulsion as the scooter increases in speed. Once cable 296 is released, spring 286 acts to return anchor lever 288 to the starting position.

While the exemplary embodiments have been described to utilize chain and sprockets, other elongate flexible tension members and their corresponding pulleys and sheaves are contemplated. For example, suitable timing belts and timing pulleys should be considered equivalent to a chains and sprockets.

Accordingly, the foot board scooter has been described with some degree of particularity directed to the exemplary embodiments. It should be appreciated, though, that the present invention is defined by the following claims construed in light of the prior art so that modifications or changes may be made to the exemplary embodiments without departing from the inventive concepts contained herein.

We claim:

1. A non-motorized vehicle, comprising:
   A. an elongate frame; and
   B. a drive train including:
      i. an arm rotatably and centrally disposed on the frame and extending upwardly therefrom;
      ii. a first sprocket including a plurality of teeth disposed about a first axis and rotatably mounted to said arm about a second axis that is offset from said first axis;
      iii. a drive wheel and an associated second sprocket; and
      iv. a chain including a first end portion mounted to said frame at a first location, extending around said first and second sprockets, and including a second end portion secured to a movable mount, whereby movement of said movable mount causes said first sprocket to rotate independently of said arm, said chain being routed such that as said arm is rotated said chain is drawn across said second sprocket thereby rotating said drive wheel.

2. A non-motorized vehicle according to claim 1 wherein said second sprocket is connected to said drive wheel with a clutch.

3. A non-motorized vehicle according to claim 2 wherein said clutch is a one-way needle bearing.

4. A non-motorized vehicle according to claim 1 including a hand lever and a cable connected between said hand lever and said movable mount, whereby movement of said hand lever causes said movable mount to change positions.

5. A non-motorized vehicle according to claim 4 wherein said movable mount comprises a lever arm pivotably mounted to said frame and including a first lever end and an opposing second lever end, wherein said second end portion of said chain is secured to said first lever end and said cable is secured to said second lever end.

6. A non-motorized vehicle according to claim 1 wherein said arm extends upwardly from the center of the width of said frame.

7. A non-motorized vehicle according to claim 6 wherein said frame includes a guard disposed between said arm and said drive wheel.

8. A non-motorized vehicle according to claim 6 wherein said first sprocket is mounted offset from the center of the width of said frame.

9. A non-motorized vehicle according to claim 8 wherein said chain extends around a pulley wherein said pulley is resiliently biased against said chain.

10. A non-motorized footboard scooter, comprising:
    A. an elongate frame having a length and a width;
    B. a steering assembly pivotably disposed on said frame, said steering assembly including a front wheel and handlebars; and
    C. a drive train including:
       i. an arm rotatably disposed on said frame and extending upwardly from the center of the width of said frame;
       ii. a first sprocket including a plurality of teeth disposed about a first axis and rotatably mounted on said arm about a second axis that is offset from said first axis;
       iii. a rear wheel connected to an associated second sprocket via a clutch;
       iv. a chain including a first end portion mounted to said frame at a first location, extending around said first and second sprockets, and including a second end portion secured to a movable mount, whereby movement of said movable mount causes said first sprocket to rotate independently of said arm, said chain being routed such that as said arm is rotated said chain is drawn across said second sprocket thereby rotating said rear wheel; and
       v. a pulley resiliently biased against said chain.

11. A non-motorized footboard scooter according to claim 10 wherein each of said plurality of teeth are disposed equidistant from said first axis.

12. A non-motorized footboard scooter according to claim 10 wherein said first sprocket is mounted offset from the center of the width of said frame.

13. A non-motorized footboard scooter according to claim 10 including a hand lever mounted on said handlebars and a cable connected between said hand lever and said movable mount, whereby movement of said hand lever causes said movable mount to change positions.

14. A non-motorized footboard scooter according to claim 10 including a guard disposed between said arm and said rear wheel.

* * * * *